(12) United States Patent
Maekawa (10) Patent No.: US 11,299,115 B2
(45) Date of Patent: Apr. 12, 2022

(54) POWER STORAGE UNIT CONTROL DEVICE

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventor: Kosei Maekawa, Mie (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 508 days.

(21) Appl. No.: 16/328,555

(22) PCT Filed: Aug. 29, 2017

(86) PCT No.: PCT/JP2017/030921
§ 371 (c)(1),
(2) Date: Feb. 26, 2019

(87) PCT Pub. No.: WO2018/043482
PCT Pub. Date: Mar. 8, 2018

(65) Prior Publication Data
US 2021/0300270 A1    Sep. 30, 2021

(30) Foreign Application Priority Data
Aug. 31, 2016  (JP) .............................. JP2016-169035

(51) Int. Cl.
*B60R 16/033*   (2006.01)
*H02J 7/00*     (2006.01)
*H02J 7/34*     (2006.01)

(52) U.S. Cl.
CPC .......... *B60R 16/033* (2013.01); *H02J 7/0016* (2013.01); *H02J 7/0024* (2013.01);
(Continued)

(58) Field of Classification Search
CPC .............. B60R 16/033; B60L 2240/547; H02J 7/0024; H02J 7/00306; H02J 7/342; H02J 7/0016; H02J 7/00; H02J 7/34
See application file for complete search history.

(56) References Cited

U.S. PATENT DOCUMENTS

2005/0269870 A1   12/2005  Ohashi et al.
2014/0320070 A1*  10/2014  Nakamoto .............. B60L 58/15
                                                              320/107

FOREIGN PATENT DOCUMENTS

JP    2004-260903 A    9/2004
JP    2012-091629 A    5/2012
(Continued)

OTHER PUBLICATIONS

WO 2008/053808 A1, Matsushita Electric Industrial Co. Ltd. (English version), May 8, 2008; pp. 1-23.*
(Continued)

*Primary Examiner* — Vuthe Siek
(74) *Attorney, Agent, or Firm* — Honigman LLP (57) ABSTRACT

A power storage unit control device includes a discharging circuit that discharges from a power storage unit to a load, a control circuit that controls the discharging circuit, and a switching unit that executes a discharge prohibition mode in which discharge control of the discharging circuit by the control circuit is prohibited, if a stop signal based on an operation stopped state of a vehicle is received and a power source unit is greater than or equal to a predetermined voltage, and executes a discharge permission mode in which discharge control of the discharging circuit by the control
(Continued)

circuit is permitted, if an operation signal based on the operating state of the vehicle is received and the power source unit is greater than or equal to the predetermined voltage.

2 Claims, 4 Drawing Sheets

(52) U.S. Cl.
CPC .......... *H02J 7/00306* (2020.01); *H02J 7/342* (2020.01); *B60L 2240/547* (2013.01)

(56) References Cited

FOREIGN PATENT DOCUMENTS

| JP | 2012-240486 A | 12/2012 |
|---|---|---|
| WO | 2008-053808 A1 | 5/2008 |

OTHER PUBLICATIONS

International Search Report, Application No. PCT/JP2017/030921, dated Oct. 31, 2017.

\* cited by examiner

POWER STORAGE UNIT CONTROL DEVICE

CROSS-REFERENCE TO RELATED APPLICATIONS

This application is the U.S. national stage of PCT/JP2017/030921 filed Aug. 29, 2017, which claims priority of Japanese Patent Application No. JP 2016-169035 filed Aug. 31, 2016.

TECHNICAL FIELD

The present disclosure relates to a power storage unit control device that controls the output from a power storage unit mounted in a vehicle.

BACKGROUND

As an example of in-vehicle power source systems, configurations provided with a power storage unit that functions as a backup power source in addition to a battery that functions as the main power source are known. For example, JP 2012-91629A discloses a system that supplies power to an electronic control brake from an electric double-layer capacitor that functions as a backup power source in the case where a 12V battery serving as the main power source changes to an anomalous state.

Incidentally, in a system that supplies power using a power storage unit at times such as when the main power source fails, it is necessary to monitor the output of the main power source and determine whether the output from the main power source is at a proper level. Control must then be performed such that the power storage unit enters a discharge state in the case where the output from the main power source is not at least at a proper level. However, if the power storage unit is always placed in the discharge state when the output of the main power source drops or has stopped, the power storage unit will enter the discharge state even in the case where the main power source is removed during maintenance when the vehicle is stopped, for example, thus inviting the risk of electric shock during maintenance and unnecessary power consumption.

The present disclosure has been made based on the circumstances described above, and has an object of providing a power storage unit control device that is able to permit discharging of a power storage unit during vehicle operation (state where the vehicle is operating), and is able to prohibit discharging of the power storage unit when during vehicle operation stoppage (state where the vehicle has stopped operating) under a predetermined condition. Note that "during vehicle operation" is a state where the system of the vehicle is running, and "during vehicle operation stoppage" is a state where the system of the vehicle has stopped.

SUMMARY

The present disclosure relates to a power storage unit control device in an in-vehicle power source system that includes a power source unit, a charging circuit configured to perform charging based on power from the power source unit, a power storage unit configured to be charged by the charging circuit, and a discharging circuit configured to discharge from the power storage unit to a load. The power storage unit control device comprises the discharging circuit; a control unit configured to control the discharging circuit; and a switching unit configured to monitor a first voltage, which is a voltage that is applied to a wiring unit that, on one side of a relay that switches to an ON state in a case where a predetermined start operation for starting a vehicle is performed and switches to an OFF state in the case where a predetermined stop operation for stopping the vehicle is performed, is provided between the power source unit and the relay, and a second voltage, which is a voltage that is applied to a conduction path provided on the other side of the relay, and, when the first voltage is larger than a predetermined value in a case where the second voltage switches from a state of being larger than a predetermined value to a state of being smaller than the predetermined value, to execute a discharge prohibition mode in which discharge control of the discharging circuit by the control unit is prohibited, and, when the first voltage is smaller than the predetermined value in a case where the second voltage switches from a state of being larger than a predetermined value to a state of being smaller than the predetermined value, to execute a discharge permission mode in which discharge control of the discharging circuit by the control unit is permitted, wherein the control unit causes the discharging circuit to perform a discharging operation in a case where a voltage of the power source unit is less than or equal to a predetermined value in a state where the switching unit is executing the discharge permission mode, and does not cause the discharging circuit to perform the discharging operation in a case where the voltage of the power source unit is less than or equal to a predetermined value in a state where the switching unit is executing the discharge prohibition mode.

Advantageous Effects of Disclosure

In the power storage unit control device of the present disclosure, the switching unit executes the discharge permission mode in the case where the vehicle is in the operating state (during vehicle operation), and permits discharge control of the discharging circuit by the control unit. The power storage unit can thereby be used as a power source during vehicle operation. Also, when during vehicle operation stoppage in a state where the switching unit is executing the discharge permission mode with the output of the power source unit in a normal state, the switching unit executes the discharge prohibition mode, and continues to execute the discharge prohibition mode until during vehicle operation. In other words, the switching unit is able to execute the discharge prohibition mode and prohibit discharge control of the discharging circuit by the control unit when during vehicle operation stoppage in a state where the discharge permission mode is executed (i.e., in the case of vehicle operation stopping normally). This power storage unit control device is thus able to suppress unnecessary power consumption during vehicle operation stoppage.

Also, discharging of the power storage unit during vehicle operation can be permitted, and, in the case where the output voltage of the power source unit is less than or equal to a predetermined value at this time, the discharging circuit can be caused to perform the discharging operation and the power storage unit can be caused to function as a backup power source. On the other hand, since a discharge prohibition mode is executed by the switching unit during vehicle operation stoppage, it is possible to prevent causing the discharging operation to be performed even in the case where the output voltage of the power source unit is less than or equal to the predetermined value.

DETAILED DESCRIPTION OF PREFERRED EMBODIMENTS

Here, desirable examples of the present disclosure will be shown. The present disclosure is, however, not limited to the following examples.

The power storage unit control device of the present disclosure can be provided with the power storage unit. This power storage unit control device facilitates optimizing and streamlining the circuit configuration according to the power storage unit that is provided.

First Embodiment

Hereinafter, a first embodiment that embodies the present disclosure will be described.

Figure 1:
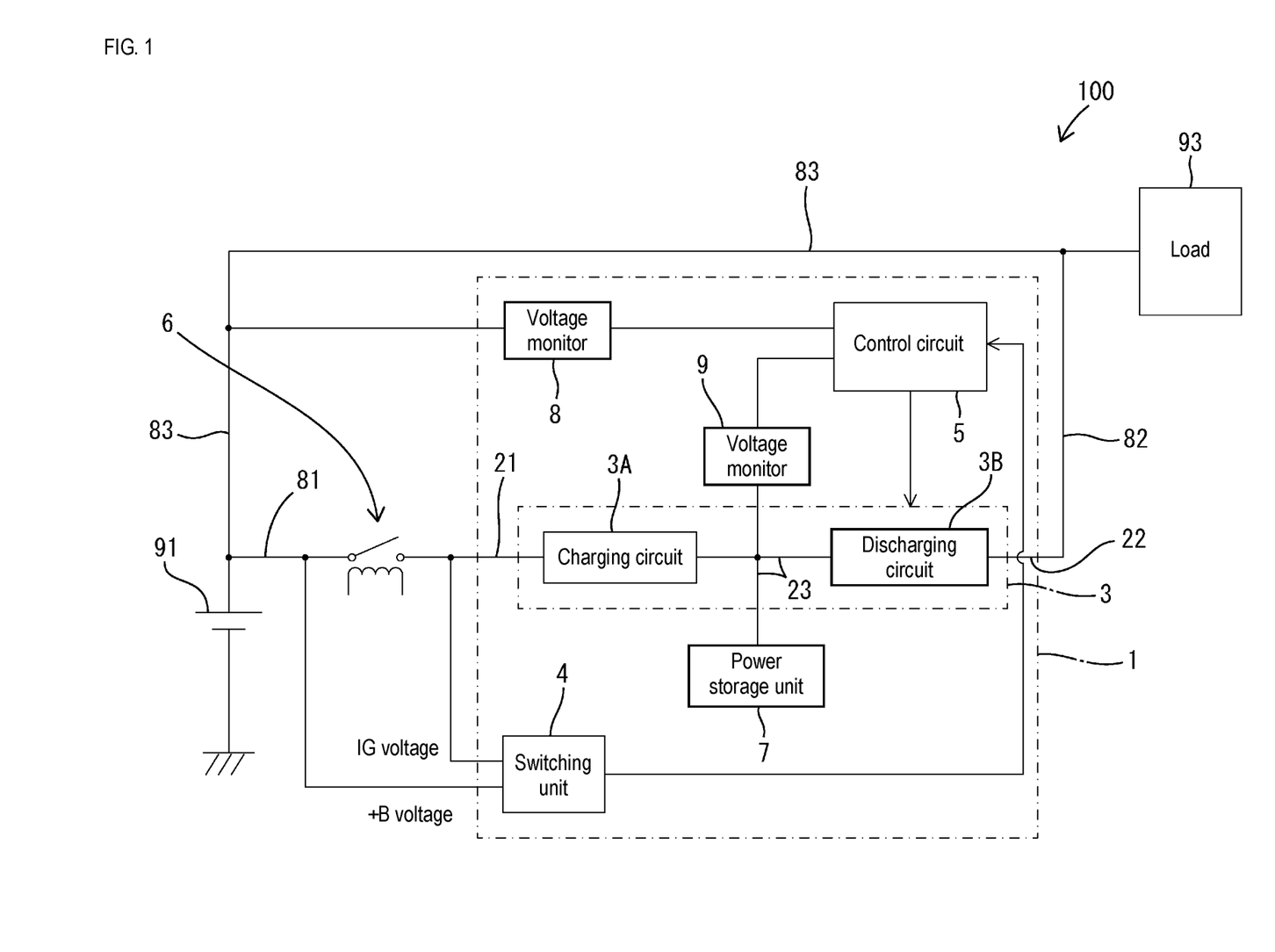
FIG. 1 is a block diagram illustrating a power source system provided with a power storage unit control device of a first embodiment.

FIG. 1 shows a block diagram of an in-vehicle power source system 100 provided with a power storage unit control device 1 according to the first embodiment. The in-vehicle power source system 100 is provided with a power source unit 91, which is the main power source, and the power storage unit control device 1, and is constituted as a system that is able to supply power to a load 93. The in-vehicle power source system 100 is constituted as a system that can supply power from the power source unit 91 to the load 93 in the case where the power supply from the power source unit 91 is in a normal state. Note that, hereinafter, the case where the output voltage that is output by the power source unit 91 exceeds a predetermined value will be described as "the normal state".

The power storage unit control device 1 has a power storage unit 7 and a discharging circuit 3B, and is configured to switch between discharging and discharge stoppage of the power storage unit 7 by the discharging circuit 3B, and to supply power from the power storage unit 7 to the load 93 at the time of discharging. The power storage unit control device 1 is configured to stop discharging of the power storage unit 7 in the case of the normal state where the output voltage of the power source unit 91 exceeds the predetermined value, and to supply power from the power storage unit 7 to the load 93 in the case of an anomalous state where the output voltage of the power source unit 91 has dropped to less than or equal to the predetermined value under a predetermined condition. In this way, the power storage unit control device 1 is configured to control discharging from the power storage unit 7, in the in-vehicle power source system 100 provided with the power source unit 91 and the power storage unit 7.

The power source unit 91 is constituted as a known in-vehicle battery such as a lead battery, for example. The power source unit 91 is electrically connected to a wiring unit 81 and a wiring unit 83 at a terminal on the high potential side, and applies a predetermined output voltage (also referred to below as +B voltage) to the wiring unit 81 and the wiring unit 83. Note that a power generator (not shown) is also electrically connected to the wiring unit 81 and the wiring unit 83.

The load 93 is constituted as a known in-vehicle electrical component. The load 93 is, as a preferable example, an electrical component that is desirably supplied with power even when the power source unit 91 fails, such as an actuator or an ECU in a shift-by-wire system, for example. The load 93 operates based on the power supply from the power source unit 91 in the case of the normal state mentioned above, and operates based on the power supply from the power storage unit 7 in the case of the anomalous state.

The power storage unit control device 1 is provided with the power storage unit 7, a charging-discharging circuit unit 3, a switching unit 4, a control circuit 5 which is a control unit, a first voltage monitor 8, a second voltage monitor 9, and the like.

The power storage unit control device 1 has a first conduction path 21 electrically connected to the wiring unit 81 via an ignition relay 6 (hereinafter, IG relay 6), a second conduction path 22 connected to a wiring unit 82, and a third conduction path 23 connected to the power storage unit 7. The second conduction path 22 is electrically connected to the load 93 via the wiring unit 82. The load 93 is electrically connected to the power source unit 91 via the wiring unit 83. Note that a switch element (not shown) such as a MOSFET may be provided in the wiring unit 83. In this case, a configuration can be adopted in which the load 93 and the power source unit 91 are in an electrically connected state in the case where the switch element is performing an ON operation, and the electrical connection between the load 93 and the power source unit 91 is interrupted in the case where the switch element is performing an OFF operation.

The IG relay 6 is a relay that switches to an ON state in the case where a predetermined start operation (ignition-ON operation (IG-ON operation)) for starting an engine is performed on an operation unit (not shown) provided in the vehicle, and switches to an OFF state in the case where a predetermined stop operation (ignition-OFF operation (IG-OFF operation)) for stopping the engine is performed on the operation unit. This IG relay 6 enters an energized state in the case of the ON state, and the wiring unit 81 is electrically connected to the first conduction path 21. The power supply voltage (+B voltage) of the power source unit 91 is supplied to the power storage unit control device 1 by such an ON operation of the IG relay 6. The IG relay 6 enters a de-energized state in the case of the OFF state, and the power supply voltage (+B voltage) applied to the wiring unit 81 is not supplied to the first conduction path 21 at this time.

In this configuration, "during vehicle operation" is a state where the system of the vehicle is running; specifically, a state where the IG relay 6 is performing an ON operation, and is a state where the power supply voltage (+B voltage) can be supplied to the power storage unit control device 1 via the IG relay 6. In the following description, the power supply voltage (+B voltage) that is applied to the first conduction path 21 via the IG relay 6 is also referred to as an IG voltage.

The power storage unit 7 is constituted by a known power storage means such as an electric double-layer capacitor, for example. The power storage unit 7 is electrically connected to the charging-discharging circuit unit 3 described later, and is charged or discharged by the charging-discharging circuit unit 3.

The charging-discharging circuit unit 3 has a charging circuit 3A and the discharging circuit 3B, and can perform a charging operation for charging the power storage unit 7 and a discharging operation for discharging the power storage unit 7, based on power from the power source unit 91. The charging operation by the charging circuit 3A is controlled by the control circuit 5, and the discharging operation by the discharging circuit 3B is also controlled by the control circuit 5.

The charging circuit 3A is given a charge instruction signal instructing that the power storage unit 7 be charged or a charge stop signal instructing that charging of the power storage unit 7 be stopped from the control circuit 5 described later. The charging circuit 3A is constituted as a known charging circuit such as a DC-DC converter, for example, and generates a charging current based on power from the power source unit 91 in the case where the charge instruction signal is given to the charging circuit 3A by the control circuit 5, and supplies the charging current to the power storage unit 7 via the third conduction path 23. In the case where the charge stop signal is given to the charging circuit 3A by the control circuit 5, the control circuit 5 does not perform the charging operation, and the charging current is not supplied to the power storage unit 7 at this time.

The discharging circuit 3B can perform a discharging operation for discharging the power storage unit 7, and a stop operation for stopping discharging of the power storage unit 7. The discharging circuit 3B need only be configured to switch the state of the third conduction path 23 and the second conduction path 22 between the electrically connected state and the electrically disconnected state, and a configuration in which a switch element (not shown) such as a MOSFET is interposed between the third conduction path 23 and the second conduction path 22 may be adopted, for example. Note that since power can be supplied to the load 93 even when the electrical energy stored in the power storage unit 7 is low if a known booster circuit such as a booster DC-DC converter is used for the discharging circuit 3B, use of the electrical energy stored in the power storage unit 7 can be maximized.

The discharging circuit 3B performs the discharging operation from the power storage unit 7 to the second conduction path 22, in the case where the discharge instruction signal is given by the control circuit 5. Also, in the case where the discharge instruction signal is not given by the control circuit 5 (in the case where the discharge stop signal is given), the discharging operation from the power storage unit 7 to the second conduction path 22 is not performed. Specifically, a discharge permission signal or a discharge prohibition signal is given to the control circuit 5 by the switching unit 4. The control circuit 5, in the case where the discharge permission signal is given by the switching unit 4, and it is determined that discharging from the power storage unit 7 is required, gives the discharge instruction signal to the discharging circuit 3B to execute discharge control, sets the switch element interposed between the second conduction path 22 and the third conduction path 23 to the ON state, and electrically connects the third conduction path 23 and the second conduction path 22. Here, the discharging operation is an operation that involves the discharging circuit 3B setting the switch element to the ON state and electrically connecting the third conduction path 23 and the second conduction path 22. On the other hand, the control circuit 5, in the case where the discharge prohibition signal is given by the switching unit 4, gives the discharge stop signal to the discharging circuit 3B to prevent execution of the discharge control, sets the switch element interposed between the second conduction path 22 and the third conduction path 23 to the OFF state, and interrupts the electrical connection between the third conduction path 23 and the second conduction path 22, regardless of whether discharging from the power storage unit 7 is required. The discharging circuit 3B is thereby configured so as to not perform the discharging operation from the power storage unit 7 to the second conduction path 22 (i.e., discharging operation to the load 93).

Figure 2:
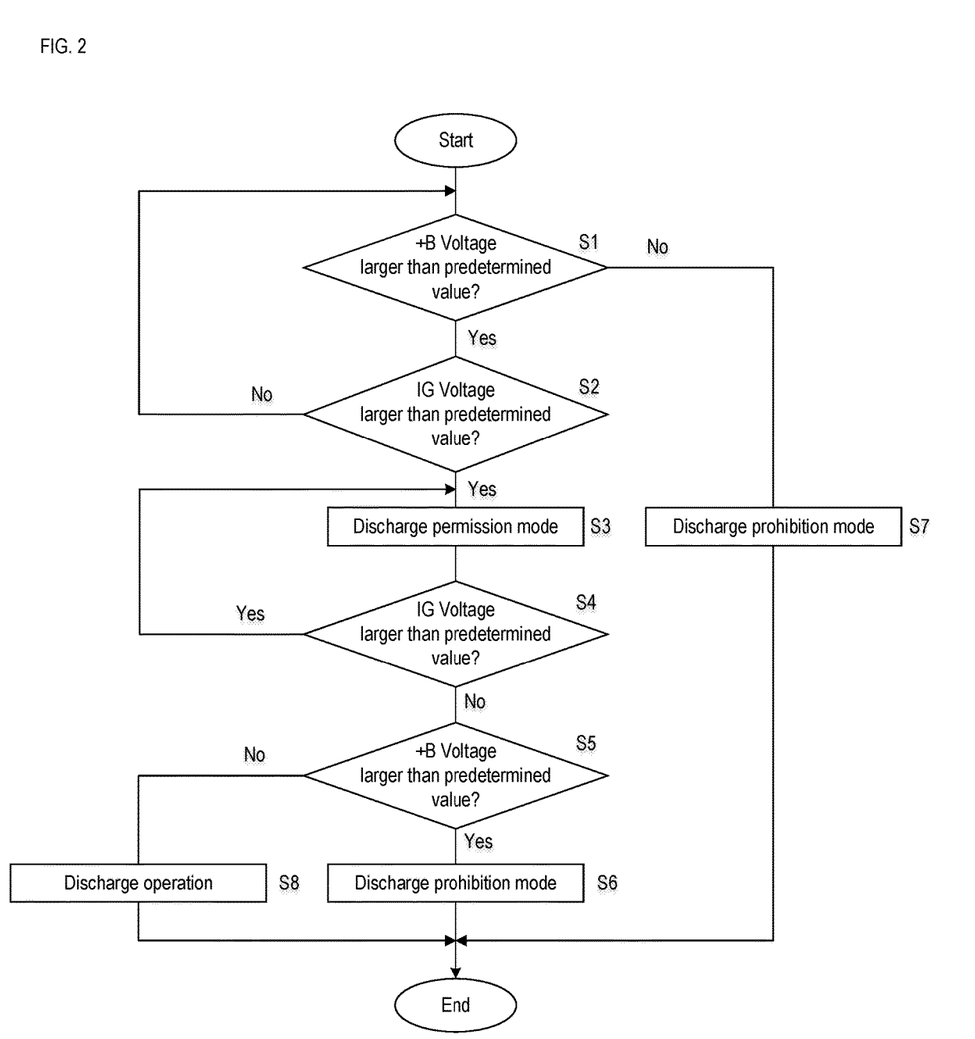
FIG. 2 is a flowchart illustrating operations of a switching unit in the power storage unit control device of the first embodiment.

The switching unit 4 is a circuit that executes the discharge prohibition mode in which execution of discharge control of the discharging circuit 3B by the control circuit 5 is prohibited or the discharge permission mode in which execution of discharge control of the discharging circuit 3B by the control circuit 5 is permitted. This switching unit 4 operates with a flow as shown in FIG. 2, for example, and outputs either the discharge permission signal or the discharge prohibition signal to the control circuit 5. The discharge permission mode is a control in which the switching unit 4 outputs the discharge permission signal, and the discharge prohibition mode is a control in which the switching unit 4 outputs the discharge prohibition signal. Note that the switching unit 4 need only be a circuit that can perform operations such as shown in FIG. 2, may be constituted as a hardware circuit other than a microcomputer or may be constituted as a microcomputer. Also, the switching unit 4 and the control circuit 5 may be constituted as the same microcomputer. Note that the control circuit 5 and the switching unit 4 are desirably configured to operate continuously even in the case where the power source unit 91 fails, and are, for example, desirably configured to receive power supply from the power storage unit 7 even at the time of failure of the power source unit 91.

The switching unit 4 is electrically connected to both the wiring unit 81 and the first conduction path 21, and the voltage of the wiring unit 81 and the voltage of the first conduction path 21 are input on different paths. In this way, since the voltage of the wiring unit 81 and the voltage of the first conduction path 21 are input to the switching unit 4 on separate paths, the switching unit 4 is able to monitor the voltage (+B voltage) of the wiring unit 81 and the voltage (IG voltage) of the first conduction path 21. The switching unit 4 gives the discharge permission signal for permitting discharging from the power storage unit 7 to the control circuit 5 or the discharge prohibition signal for prohibiting discharging from the power storage unit 7, on the basis of the change in magnitude of the +B voltage and the IG voltage. Note that the operations of the switching unit 4 will be described in detail later.

The control circuit 5 is constituted as a microcomputer, for example, and has computation unit such as a CPU, a memory such as a ROM or a RAM, an A/D converter, and the like. The control circuit 5 is able to grasp the voltage value of the wiring unit 83 (i.e., output voltage value of the power source unit 91) by the detection value that is input from the first voltage monitor 8 described later, and is able to grasp the voltage value of the third conduction path 23 (i.e., output voltage value of the power storage unit 7) by the detection value that is input from the second voltage monitor 9 described later.

The control circuit 5 is able to control the charging operation and the discharging operation by the charging-discharging circuit unit 3. Specifically, the control circuit 5 is able to control charging by giving the charge instruction signal or the charge stop signal to the charging circuit 3A, and to control discharging by giving the discharge instruction signal or the discharge stop signal to the discharging circuit 3B. Note that the charge instruction signal and the charge stop signal are mutually complementary, with one of the signals being given to the charging circuit 3A, and under no circumstances are both signals given to the charging circuit 3A at the same time. Furthermore, the discharge instruction signal and the discharge stop signal are also mutually complementary, with one of the signals being given to the discharging circuit 3B, and under no circumstances are both signals given to the discharging circuit 3B at the same time.

The first voltage monitor 8 is constituted as a known voltage detection circuit, and inputs a value corresponding to the voltage (+B voltage) of the wiring unit 83 (detected value that can specify the +B voltage which is the output voltage of the power source unit 91) to the control circuit 5 as an analog voltage signal. The second voltage monitor 9 is constituted as a known voltage detection circuit, and inputs a value corresponding to the voltage of the third conduction path 23 (detection value that can specify the output voltage of the power storage unit 7) to the control circuit 5 as an analog voltage signal. The control circuit 5 is thereby able to grasp the voltage value of the wiring unit 83 based on the detection value (analog voltage signal) input from the first voltage monitor 8 and to grasp the voltage value of the third conduction path 23, based on the detection value (analog voltage signal) input from the second voltage monitor 9. The control circuit 5 determines whether charging to the power storage unit 7 is required and whether discharging from the power storage unit 7 is required, based on the detection value input from the first voltage monitor 8, the detection value input from the second voltage monitor 9, and the like, and is able to control charging by giving the charge instruction signal or the charge stop signal to the charging circuit 3A, and to control discharging by giving the discharge instruction signal or the discharge stop signal to the discharging circuit 3B, according to the discharge permission signal or the discharge prohibition signal that is given by the switching unit 4.

Here, operations of the switching unit 4 will be described with reference to FIG. 2 and the like.

The switching unit 4 gives the discharge permission signal or the discharge prohibition signal to the control circuit 5, based on the change in the magnitude of the +B voltage and the IG voltage. Note that the discharge permission signal and the discharge prohibition signal are mutually complementary, with one of signals being given to the control circuit 5, and under no circumstances are both signals given to the control circuit 5 at the same time.

The control shown in FIG. 2 is control that is executed by the switching unit 4 and repeated during vehicle operation (while the system of the vehicle is running). First, the switching unit 4 determines whether the voltage (+B voltage) of the wiring unit 81 is larger than a predetermined value (step S1). The predetermined value that is used in this determination is a value for determining whether the wiring units 81 and 83 and the first conduction path 21 have a normal voltage value (regular output voltage value of the power source unit 91), and is set to a value lower than the output voltage value when the power source unit 91 is at full charge; specifically, to a value slightly higher than 0 V. The switching unit 4 shifts to step S2 if the voltage (+B voltage) of the wiring unit 81 is larger than the predetermined value, and shifts to step S7 if the voltage (+B voltage) of the wiring unit 81 drops to less than or equal to the predetermined value.

The switching unit 4, in the case where it is determined in step S1 that the voltage (+B voltage) of the wiring unit 81 is less than or equal to the predetermined value, executes control (discharge prohibition mode) for outputting the discharge prohibition signal to the control circuit 5 in step S7. In the case where the discharge prohibition mode is executed in this way, the state where the discharge prohibition signal is output to the control circuit 5 from the switching unit 4 is maintained until the discharge permission mode is next executed.

The switching unit 4, in the case where it is determined in step S1 that the voltage (+B voltage) of the wiring unit 81 is larger than the predetermined value, determines whether the voltage (IG voltage) of the first conduction path 21 is larger than a predetermined value (step S2). The switching unit 4 then shifts to step S3 if it is determined in step S2 that the IG voltage is larger than the predetermined value, and shifts to step S1 if it is determined that the IG voltage is less than or equal to the predetermined value. In this configuration, the IG voltage at the time of being less than or equal to the predetermined value corresponds to an example of a stop signal that is based on the operation stopped state of the vehicle.

The switching unit 4, in the case where it is determined in step S2 that the voltage (IG voltage) of the first conduction path 21 is larger than a predetermined value, executes control (discharge permission mode) for outputting the discharge permission signal to the control circuit 5. In this configuration, the IG voltage at the time of being larger than the predetermined value corresponds to an example of an operation signal that is based on the operating state (during vehicle operation) of the vehicle. In the case where the discharge permission mode is started in this way, the state where the discharge permission signal is output to the control circuit 5 by the switching unit 4 is maintained until the discharge prohibition mode is next executed. Note that the case where it is determined in the affirmative in step S1 and in the affirmative in step S2 is a case where the IG relay 6 has entered the ON state and the engine has started operating in the vehicle with the output voltage of the power source unit 91 in the normal state (state where the predetermined value has been exceeded). The IG relay 6 is in the ON state in this way "during vehicle operation", and the switching unit 4 will execute the discharge permission mode at this time.

The switching unit 4, after executing the operation of step S3, determines whether the voltage (TO voltage) of the first conduction path 21 is larger than a predetermined value (step S4). The switching unit 4 shifts to step S3 if it is determined in step S4 that the IG voltage is larger than the predetermined value, and shifts to step S5 if it is determined that the IG voltage is less than or equal to the predetermined value. In other words, the switching unit 4 continuously monitors the voltage (TO voltage) of the first conduction path 21 after executing the operation of step S3, and repeats the determination of step S4 while executing the discharge permission mode during the period in which the voltage (IG voltage) of the first conduction path 21 is larger than the predetermined value.

The switching unit 4, in the case where it is determined in step S4 that the voltage (IG voltage) of the first conduction path 21 is less than or equal to the predetermined value, determines in step S5 whether the voltage (+B voltage) of the wiring unit 81 is larger than a predetermined value.

The switching unit 4, in the case where it is determined in step S5 that the +B voltage is larger than the predetermined value, executes control (discharge prohibition mode) for giving the discharge prohibition signal to the control circuit 5 in step S6, and ends the control of FIG. 2. In the case where the discharge prohibition mode is executed in step S6, the state where the discharge prohibition signal is output to the control circuit 5 from the switching unit 4 is maintained until the discharge permission mode is next executed. It is determined in the negative in step S4 and in the affirmative in step S5 in the case where the ignition-OFF operation (IG-OFF operation) is performed with the output of the power source unit 91 in the normal state in the vehicle, and the IG relay 6 turns OFF. In such a case, the discharge prohibition mode is executed by the switching unit 4, and the electrical connection between the power storage unit 7 and the second conduction path 22 is interrupted and discharge to the load 93 from the power storage unit 7 is prohibited, until the discharge permission mode is next executed.

In this way, the switching unit 4 executes the discharge permission mode in step S3, and, in the case where vehicle operation is stopped in a state where the discharge permission mode is being executed with the output of the power source unit 91 in the normal state, executes the discharge prohibition mode in step S6, and continues to execute the discharge prohibition mode until vehicle operation is started.

The switching unit 4 shifts to step S8, if it is determined in step S5 that the +B voltage is less than or equal to the predetermined value. The switching unit 4, in step S8, executes control (discharge permission mode) for giving the discharge permission signal to the control circuit 5. Furthermore, during step S8, the discharge instruction signal is given to the discharging circuit 3B by the control circuit 5, and the power storage unit 7 is discharged. It is determined in the negative in step S4 and in the negative in step S5 in the case where the power source unit 91 is highly likely to have failed during vehicle operation. In such a case, the power storage unit 7 is discharged with the power storage unit 7 functioning as a backup power source.

With this configuration, the control circuit 5 functions as a control unit, and, in the case where the output voltage of the power source unit 91 is less than or equal to a predetermined value (specifically, in the case where the +B voltage applied to the wiring unit 83 is less than or equal to a predetermined value), operates to output the discharge instruction signal to the discharging circuit 3B, and, in the case where the output voltage of the power source unit 91 exceeds the predetermined value (specifically, in the case where the +B voltage exceeds the predetermined value), operates to output the discharge stop signal to the discharging circuit 3B. If it is determined in the negative in step S5, that is, if the output voltage of the power source unit 91 is less than or equal to the predetermined value (if the +B voltage is less than or equal to the predetermined value), the switching unit 4 executes control (discharge permission mode) for outputting the discharge permission signal to the control circuit 5, and thus the discharge instruction signal is output to the discharging circuit 3B by the control circuit 5, and the discharging circuit 3B is operated to perform discharging. In the case where the control circuit 5 causes the discharging circuit 3B to perform the discharging operation during step S8, this discharging operation can be executed until a predetermined end time (e.g., time at which the operation of the load 93 which is to be backed up is complete) is reached. Also, in this case, since it is highly likely that the power source unit 91 has failed, a configuration may be adopted in which the control circuit 5 performs a predetermined notification operation (display on a display unit, etc., transmission of anomaly information to an external ECU, etc.).

Next, the operations of the power storage unit control device 1 will be described.

With this configuration, the vehicle is operating and the system of the vehicle is running, during the period from when the IG relay 6 switches to the ON state and the IG voltage rises to exceed a predetermined value until when the IG relay 6 switches to the OFF state and the IG voltage drops to less than or equal to the predetermined value, for example. Also, the vehicle has stopped operating and the system of the vehicle is in a stopped state, during the period from when the IG relay 6 switches to the OFF state and the IG voltage drops to less than or equal to the predetermined value until when the IG relay 6 switches to the ON state and the IG voltage rises to larger than the predetermined value.

The power storage unit control device 1 operates the charging circuit 3A under a predetermined condition to supply charging current to the power storage unit 7 in the case of the normal state where the output voltage of the power source unit 91 is larger than a predetermined value, and operates the discharging circuit 3B under a predetermined condition to discharge from the power storage unit 7 to the load 93 in the case of an anomalous state where the output voltage of the power source unit 91 drops to less than or equal to the predetermined value.

First, the operations in the case of the normal state will be described.

When an IG-ON operation (ON operation for performing an ON operation of the ignition switch) is performed in a vehicle in which the in-vehicle power source system 100 is installed, the IG relay 6 switches from the OFF state to the ON state, and the wiring unit 81 and the first conduction path 21 are electrically connected. The IG voltage is thereby applied to the power storage unit control device 1.

In the case of the normal state, the +B voltage that is input to the switching unit 4 will be larger than the predetermined value, and the IG voltage will also be larger than the predetermined value. The switching unit 4 thus gives the discharge permission signal to the control circuit 5 (step S3 in FIG. 2). In this way, the switching unit 4 executes control (discharge permission mode) for outputting the discharge permission signal to the control circuit 5, in the case where vehicle operation is started with the output voltage of the power source unit 91 in the normal state (state of being larger than a predetermined value).

The control circuit 5, in the case of the normal state, outputs the discharge stop signal to the discharging circuit 3B. During the period in which the discharge stop signal is being output by the control circuit 5, the discharging circuit 3B interrupts the electrical connection between the third conduction path 23 and the second conduction path 22, and discharging from the power storage unit 7 to the load 93 is not performed.

When the IG-OFF operation (operation that involves performing an OFF operation of the ignition switch) is performed in the case of the normal state, the IG relay 6 switches from the ON state to the OFF state, and electrical connection between the wiring unit 81 and the first conduction paths 21 is interrupted. The output voltage of the power source unit 91 is thereby no longer applied in the power storage unit control device 1.

In the case where the IG relay 6 switches from the ON state to the OFF state with the output of the power source unit 91 in the normal state, the IG voltage changes from a state of being larger than a predetermined value to being less than or equal to the predetermined value, with the +B voltage that is input to the switching unit 4 in a state of being larger than a predetermined value. Then the switching unit 4 executes the discharge prohibition mode, and outputs the discharge prohibition signal to the control circuit 5 (step S6 in FIG. 2). In the case where output of the discharge prohibition signal is started in step S6 in this way, the switching unit 4 then continues the control (discharge prohibition mode) for giving the discharge prohibition signal to the control circuit 5, until vehicle operation is started, that is, until it is determined in the affirmative in step S2.

Next, operations in the case where the ignition switch switches from the normal state to the anomalous state in the ON state will be described.

Figure 3:
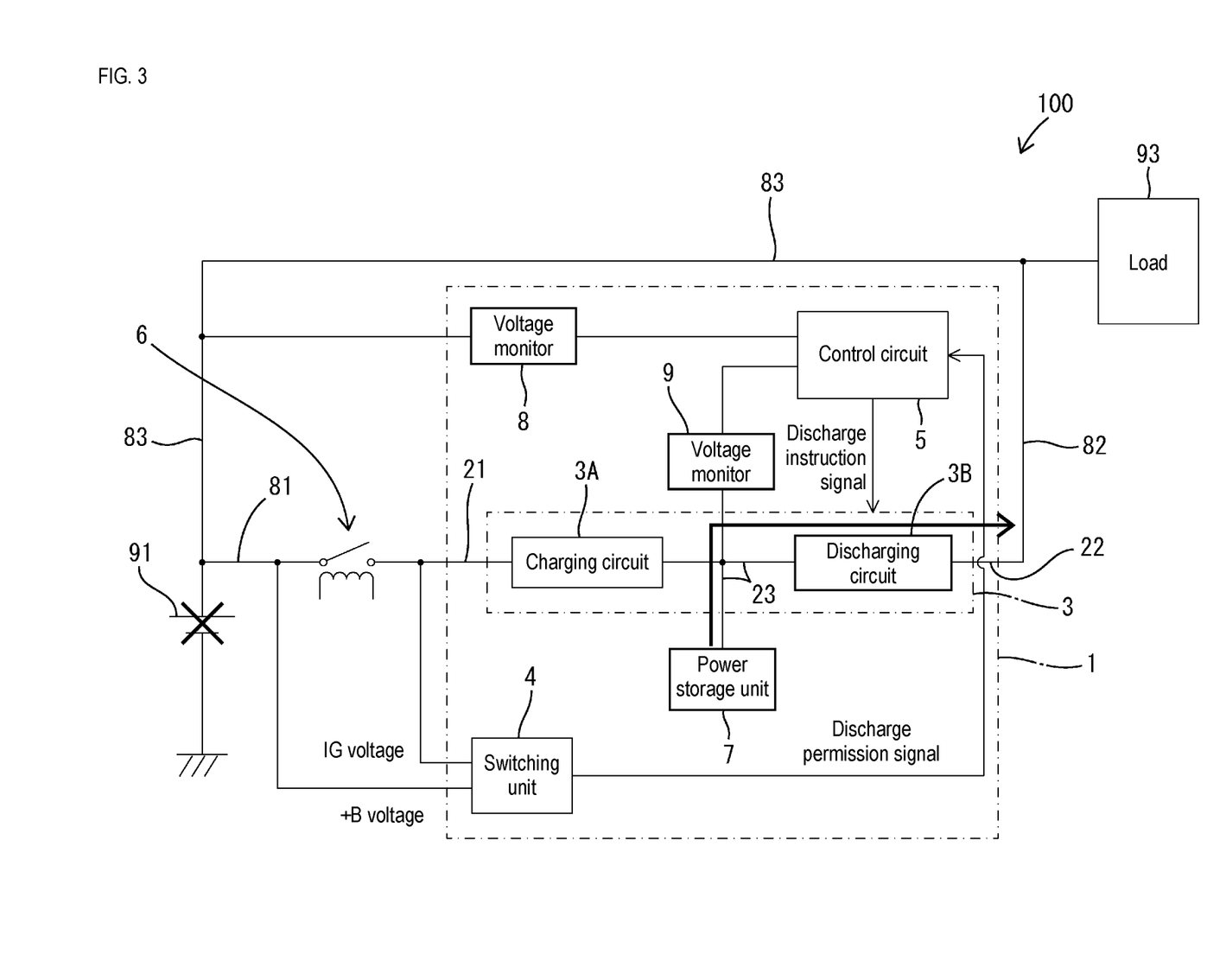
FIG. 3 is an illustrative diagram illustrating operations in the case where failure of a power source unit occurs at the time of vehicle operation in the power source system provided with the power storage unit control device of the first embodiment.

In the case where failure of the power source unit 91 or the like occurs as shown in FIG. 3 with the ignition switch in the ON state (i.e., with the IG relay 6 in the ON state), and the voltage (+B voltage) applied to the wiring unit 81 changes from a value that exceeds a predetermined value to less than or equal to the predetermined value, the voltage (IG voltage) of the first conduction path 21 also changes from a value that exceeds a predetermined value to less than or equal to the predetermined value. In other words, the signal from the control circuit 5 will switch to the discharge instruction signal, in a state where it is determined in the negative in step S4 of FIG. 2 and in the negative in step S5, and control (discharge permission mode) for outputting the discharge permission signal started by the switching unit 4 in step S3 is executed. Accordingly, in this case, the discharging circuit 3B performs the discharging operation so as to electrically connect the third conduction path 23 and the second conduction path 22, and performs discharging from the power storage unit 7 to the load 93 as shown in FIG. 3. Note that a configuration may be adopted in which, in the case where the discharging circuit 3B is caused to perform the discharging operation in this way, OFF operation of the charging circuit 3A is performed together with OFF operation of a switch element (not shown) provided in the wiring unit 83 to prevent discharge to the first conduction path 21 side from the power storage unit 7.

Next, operations in the case where the ignition switch changes to the OFF state in the normal state and power supply from the power source unit 91 subsequently stops due to maintenance or the like will be described. Note that, in the case where the ignition switch is in the OFF state, vehicle operation has stopped, and the vehicle is not running. In this case, control for supplying the minimum power required to the load 93 of the vehicle is executed in the system of the vehicle.

Since the negative determination is repeated in step S1, in the case where the ignition switch is in the OFF state (i.e., the IG relay 6 is in the OFF state) in the normal state, and the voltage (+B voltage) applied to the wiring unit 81 after the power source unit 91 has been removed due to maintenance or the like subsequently drops to less than or equal to a predetermined value, the switching unit 4 continues the control (discharge prohibition mode) for outputting the discharge prohibition signal. Consequently, in this case, discharging from the power storage unit 7 to the load 93 is not performed. Also, in this case, since the IG voltage does not become larger than the predetermined value as long as the power source unit 91 is removed even when the ignition switch is switched to the ON state, it will not be determined in the affirmative in step S2. In other words, during the period in which power is not supply from the power source unit 91 with the ignition switch in the OFF state, the discharge prohibition mode is not canceled, and discharging from the power storage unit 7 will not be performed. Next, the effects of the power storage unit control device 1 will be illustrated.

With the power storage unit control device 1 having the above configuration, the switching unit 4 executes the discharge permission mode in the case where the vehicle is in the operating state (during vehicle operation), and discharge control of the discharging circuit 3B by the control circuit 5 is permitted. During vehicle operation, the power storage unit 7 can thereby be used as a power source. Also, in the case where vehicle operation stops in a state where the switching unit 4 is executing the discharge permission mode with the output of the power source unit 91 in the normal state, the switching unit 4 executes the discharge prohibition mode, and continues to execute the discharge prohibition mode until vehicle operation is started. In other words, when vehicle operation stops in a state where the discharge permission mode is executed (i.e., in the case where vehicle operation stops normally), the switching unit 4 is able to execute the discharge prohibition mode, and prohibit discharge control of the discharging circuit 3B by the control circuit 5. Thus, this power storage unit control device 1 is able to suppress unnecessary power consumption while vehicle operation has stopped.

Figure 4:
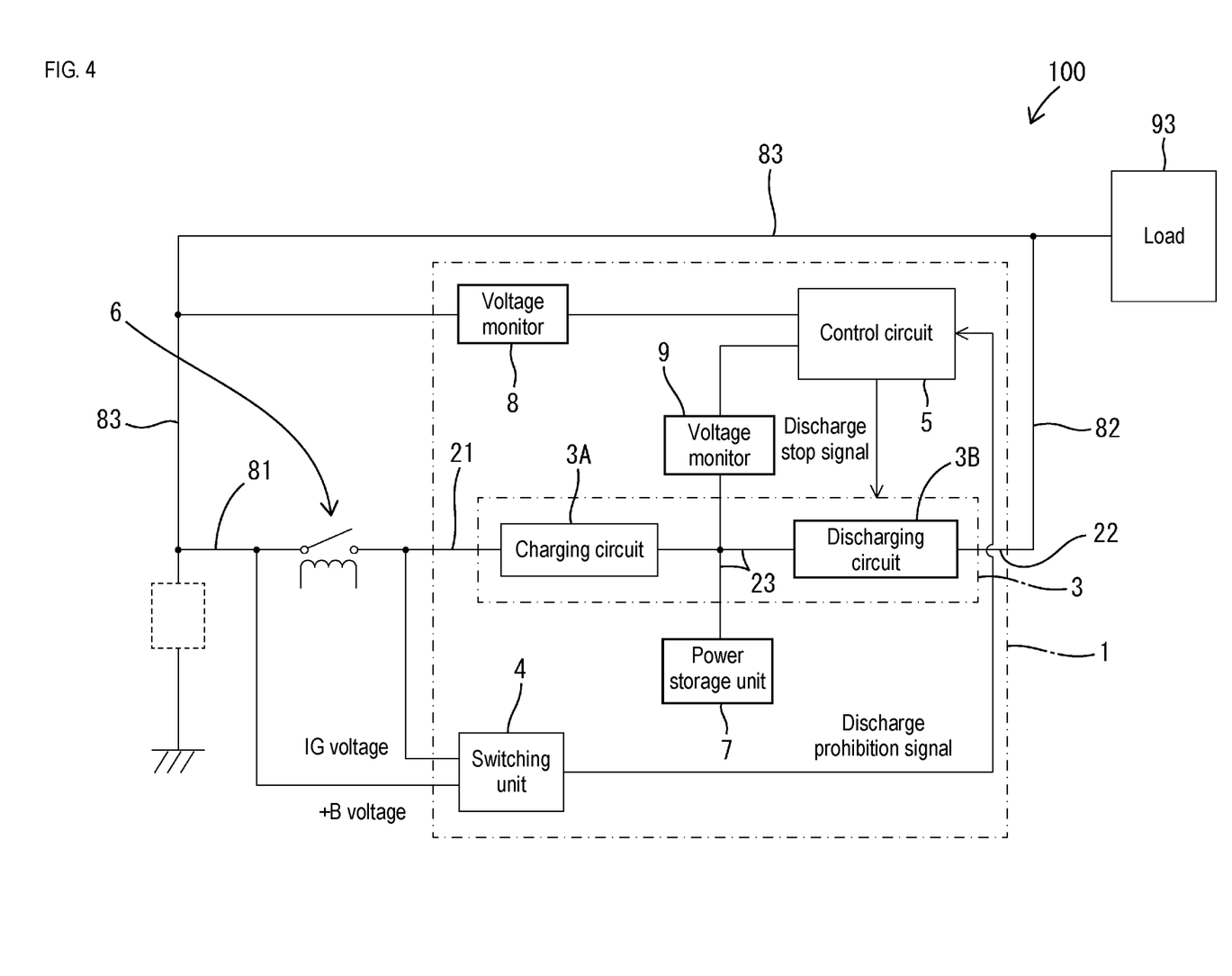
FIG. 4 is an illustrative diagram illustrating operations in the case where a power source unit has been removed at the time of vehicle operation stoppage in the power source system provided with the power storage unit control device of the first embodiment.

For example, in the case where work (maintenance work, repair work, etc.) such as removing the power source unit 91 is carried out as shown in FIG. 4 during vehicle operation stoppage in which the IG relay 6 is in the OFF state, there is concern about the control circuit 5 causing the discharging circuit 3B to perform an unnecessary discharging operation since the voltage (+B voltage) of the wiring units 81 and 83 drops, but even if the discharge instruction signal is output by the control circuit 5 in such a case, the discharge prohibition signal is continuously output by the switching unit 4, thus enabling the discharging operation of the discharging circuit 3B to be prohibited.

The control circuit 5 (control unit) of the power storage unit control device 1 causes the discharging circuit 3B to perform the discharging operation in the case where the output voltage of the power source unit 91 drops to less than or equal to a predetermined value in the state where the switching unit 4 is executing the discharge permission mode. According to this configuration, discharging of the power storage unit 7 during vehicle operation can be permitted, and in the case where the output voltage of the power source unit 91 drops to less than or equal to the predetermined value at this time, the discharging circuit 3B can be caused to perform the discharging operation, and the power storage unit 7 can be caused to function as a backup power source. On the other hand, since the discharge prohibition mode is executed by the switching unit 4 during vehicle operation stoppage, the discharging operation can be prevented from being performed even in the case where the output voltage of the power source unit 91 drops to less than or equal to the predetermined value.

Furthermore, the power storage unit control device 1 is provided with the power storage unit 7. This power storage unit control device 1 facilitates optimizing and streamlining the circuit configuration according to the power storage unit 7 that is provided. Specifically, a configuration can be adopted in which, for example, the charging-discharging circuit unit 3, the switching unit 4, the control circuit 5 and the like are mounted on the same substrate, and the power storage unit 7 is mounted on this substrate in an integrated manner.

Other Embodiments

The present disclosure is not limited to the embodiments described using the above description and drawings, and embodiments such as the following, for example, are also encompassed in the technical scope of the disclosure.

In the first embodiment, an example was given in which the power storage unit 7 is constituted as an electric double-layer capacitor, but the present disclosure is not limited to this example. For example, the power storage unit 7 may constituted by another power storage means such as a lithium ion battery or a lithium ion capacitor.

In the first embodiment, a DC-DC converter was illustrated as an example of the charging circuit 3A, but another known charging circuit may be used.

In the first embodiment, an example was given in which a switch for switching the state of the third conduction path 23 and the wiring unit 82 between an electrically connected state and a electrically disconnected state as an example of the discharging circuit 3B, but the present disclosure is not limited to this example. For example, the discharging circuit 3B may be constituted as a voltage conversion circuit that steps up or steps down the output from the power storage unit 7.

In the first embodiment, the control circuit 5 constituted as a microcomputer was illustrated, but the present disclosure is not limited thereto, and the control circuit 5 may be constituted with other hardware circuits.

In the first embodiment, "the IG relay 6 in an ON state" was illustrated as an example of "during vehicle operation" and "the IG relay 6 is an OFF state" was illustrated as an example of "during vehicle operation stoppage", but the present disclosure is not limited to this example. For example, "the state where CAN communication is being performed" may be given as "during vehicle operation", and "the state where CAN communication is not executed" can be given as "during vehicle operation stoppage." Alternatively, "the state where a fixed period has elapsed after the engine has started" may be given as "during vehicle operation", and "the state where the bonnet is opened after the IG relay 6 had turned OFF" may be given as "during vehicle operation stoppage".

In the first embodiment, "the state where the ignition switch is ON" was illustrated as an example of "during vehicle operation", but in the case where the vehicle is constituted as an electric car, the state where an EV system has been powered on, for example, may be given as "during vehicle operation".

The invention claimed is:

1. A power storage unit control device in an in-vehicle power source system that includes a power source unit, a charging circuit configured to perform charging based on power from the power source unit, a power storage unit configured to be charged by the charging circuit, and a discharging circuit configured to discharge from the power storage unit to a load, the power storage unit control device comprising:

the discharging circuit;

a control unit configured to control the discharging circuit; and a switching unit configured to monitor a first voltage, which is a voltage of the power source unit that is applied to a wiring unit, the wiring unit coupled to one side of an ignition relay, the ignition relay switches to an ON state in a case where a predetermined start operation for starting a vehicle is performed and switches to an OFF state in the case where a predetermined stop operation for stopping the vehicle is performed, is provided between the power source unit and the ignition relay, and a second voltage, which is a voltage on the other side of the ignition relay that is applied to a conduction path, the switching unit electrically connected to both the wiring unit and the first conduction path via a first path and a second path so as to monitor the first voltage and the second voltage, the ignition relay being interposed between the first path and the second path and, when the first voltage is larger than a predetermined value in a case where the second voltage switches from a state of being larger than a predetermined value to a state of being smaller than the predetermined value, to execute a discharge prohibition mode in which discharge control of the discharging circuit by the control unit is prohibited, and, when the first voltage is smaller than the predetermined value in a case where the second voltage switches from a state of being larger than a predetermined value to a state of being smaller than the predetermined value, to execute a discharge permission mode in which discharge control of the discharging circuit by the control unit is permitted, wherein the control unit causes the discharging circuit to perform a discharging operation in a case where a voltage of the power source unit is less than or equal to a predetermined value in a state where the switching unit is executing the discharge permission mode, and does not cause the discharging circuit to perform the discharging operation in a case where the voltage of the power source unit is less than or equal to a predetermined value in a state where the switching unit is executing the discharge prohibition mode.

2. The power storage unit control device according to claim 1, comprising the power storage unit.

* * * * *